(12) United States Patent
Lindback

(10) Patent No.: US 6,314,817 B1
(45) Date of Patent: Nov. 13, 2001

(54) METHOD FOR TIGHTENING A THREADED FASTENER ABOVE ITS YIELD POINT

(75) Inventor: Tobias Axel Lindback, Huddinge (SE)

(73) Assignee: Atlas Copco Tools AB, Nacka (SE)

( * ) Notice: Subject to any disclaimer, the term of this patent is extended or adjusted under 35 U.S.C. 154(b) by 0 days.

(21) Appl. No.: 09/636,476

(22) Filed: Aug. 10, 2000

Related U.S. Application Data

(63) Continuation-in-part of application No. 09/312,110, filed on May 14, 1999, now abandoned.

(30) Foreign Application Priority Data

May 14, 1998 (SE) .................................................. 9801691

(51) Int. Cl.$^7$ .................................................. F16B 31/02
(52) U.S. Cl. .................................................. 73/761
(58) Field of Search .................................................. 73/761

(56) References Cited

U.S. PATENT DOCUMENTS

| | | |
|---|---|---|
| 2,600,549 | 6/1952 | Ledbetter . |
| 3,939,920 | 2/1976 | Hardiman et al. . |
| 3,969,810 | 7/1976 | Pagano . |
| 4,104,778 | * 8/1978 | Vliet ........................................ 73/761 |
| 4,104,779 | * 8/1978 | Sigmund ................................. 73/761 |
| 4,333,351 | 6/1982 | Bickford . |
| 4,344,216 | 8/1982 | Finkelston . |
| 4,530,143 | 7/1985 | Casarcia . |
| 4,601,207 | 7/1986 | Steblay . |
| 4,620,450 | 11/1986 | Yamaguchi . |
| 4,899,591 | 2/1990 | Kibblewhite . |
| 4,941,362 | * 7/1990 | Tambini ............................. 73/862.23 |
| 5,970,798 | 10/1999 | Gleman et al. . |

FOREIGN PATENT DOCUMENTS

| | | |
|---|---|---|
| 196 43 933 | 3/1998 | (DE) . |
| 0 589 271 A1 | 3/1994 | (EP) . |
| 2 037 430 A | 7/1980 | (GB) . |

* cited by examiner

*Primary Examiner*—Max Noori
(74) *Attorney, Agent, or Firm*—Frishauf, Holtz, Goodman, Langer & Chick, P.C.

(57) ABSTRACT

A method for determining the axial load in a threaded fastener when tightened above its yield point by using the variation in travel time ($\Delta t$) for ultrasonic waves induced in the fastener to determine the axial load (N) in the fastener, both in the yield point and at the final pretension state of the fastener. The yield point of the fastener is detected by indicating a significant change in the growth of the momentary transferred torque per angle unit of rotation, and comparing the actual travel time ($\Delta t$) for ultrasonic waves in the fastener to a pre-tightening determined relationship between the axial load (N), the rotation angle ($\Phi$) and the ultrasonic wave travel time ($\Delta t$) for the actual type of fastener.

2 Claims, 4 Drawing Sheets

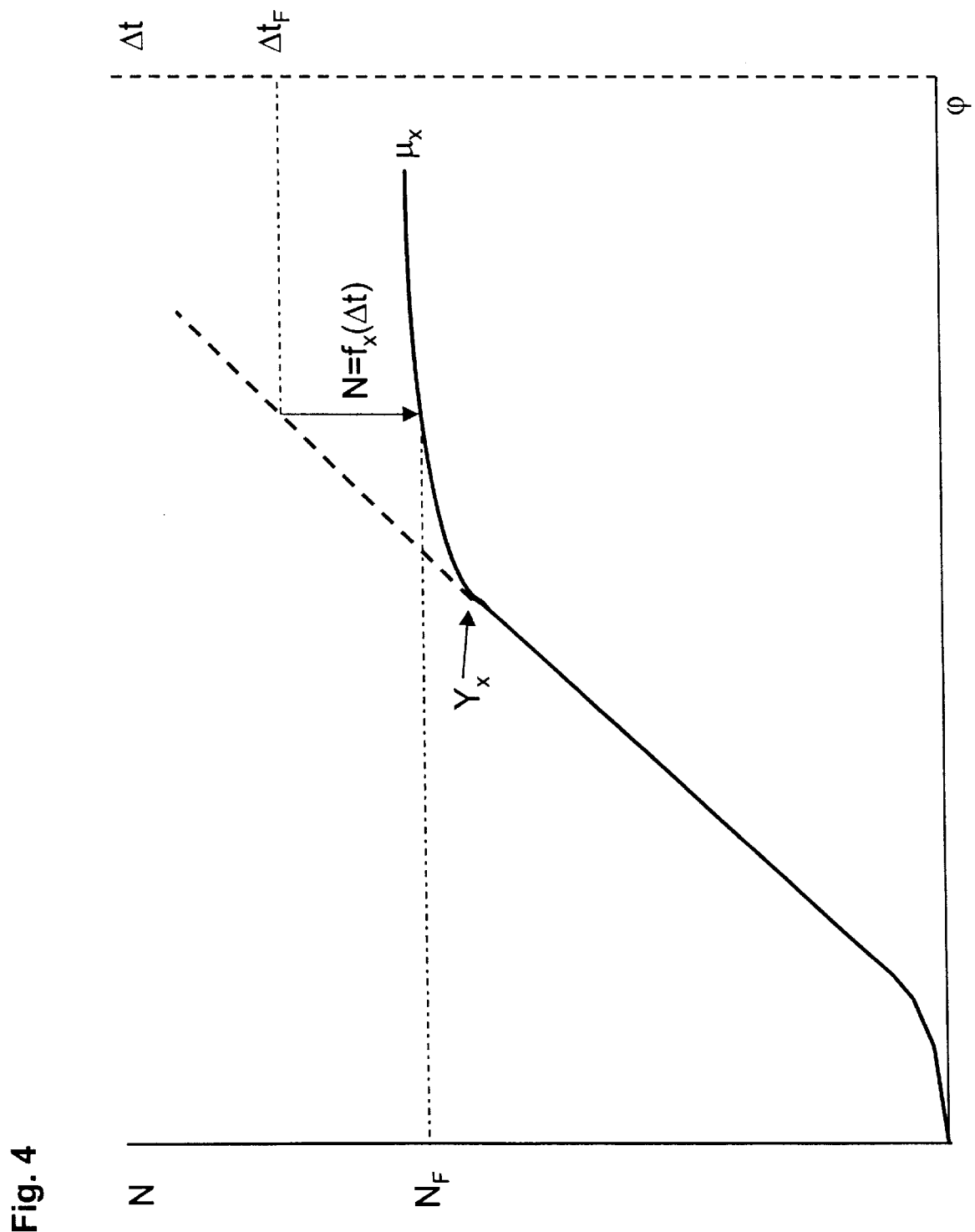

METHOD FOR TIGHTENING A THREADED FASTENER ABOVE ITS YIELD POINT

CROSS REFERENCE TO RELATED APPLICATION

This is a Continuation-In-Part of prior application Ser. No. 09/312,110 filed May 14, 1999 now abandoned.

FIELD OF THE INVENTION

The invention is related to a method for tightening a threaded fastener to and above its yield point, i.e. into the plastic deformation range of the fastener, by using the variation in travel time for ultrasonic waves induced in the fastener.

BACKGROUND OF THE INVENTION

In for instance the motor vehicle industry, it is desirable to keep down the weight of at least some types of threaded joints comprised in various vehicle structures. This is accomplished by utilising the maximum clamping force obtainable by a certain size of the fasteners comprised in the joint, which means that each fastener is tightened to its yield point, i.e. at the upper end of its elastic deformation range. This well known method is described in for instance U.S. Pat. No. 2,600,549.

However, when tightening a fastener to a level above its yield point, i.e. into the plastic deformation range, there is a problem to accurately determine the obtained axial load, because in that range the axial load does not increase linearly in relation to the angle of rotation.

In prior art, there has been no simple and reliable method available for obtaining accurate information about the accomplished axial load when tightening a fastener into the plastic deformation range.

According to one well known method for tightening a fastener into the plastic deformation range, the yield point is determined by detecting the significant change in torque growth obtained in that point, and by tightening the fastener over another predetermined angle from that point on. By this method, a high clamping ability of the fastener is utilised since it is tensioned above the yield point, but there is no possibility to determine the actually obtained axial load on the fastener. Occurring variations in the frictional resistance in the fastener cause a considerable scattering of the obtained axial load, not only in the yield point but also in the final shut-off point.

A well known method for determining the axial load on a fastener and described in for instance U.S. Pat. No 3,969,810, comprises measuring the change in travel time of ultrasonic waves induced axially into the fastener. This method is applicable on tightening a fastener within the elastic deformation range only, because the direct correspondence between the ultrasonic wave travel time and the axial load exists only when there is a linear relationship between the elongation of the fastener and the axial load. However, this is not the case in the plastic deformation range, where the fastener is elongated at a low axial load increase only. This means that this method, as previously described, is not useful to determine the axial load on a fastener at yield tightening.

There is also previously suggested a method for determining the obtained axial load in a fastener by measuring the change in travel time for ultrasonic waves induced into the fastener, also when tightening the fastener into the plastic deformation range. This method is based on a pre-tightening establishment of the relationship between the change in ultrasonic wave travel time and the axial load on the actual type of fastener. Based on this information, the obtained axial load is determined by measuring the change in the ultrasonic travel time and relating it to the previously established relationship between the travel time and the axial load.

This known method, however, does not take into account the variations in the frictional resistance and, thereby, the variations in axial load level obtained at the yield point of the fastener as well as in the plastic deformation range.

As mentioned above, the axial load in and above the yield point does not correspond directly to the elongation of the fastener but depends on the actual friction conditions in the fastener as well. This is due to the fact that a high frictional resistance in the fastener causes increased shearing stresses on the fastener, and a plastic deformation of the fastener takes place at a lower axial load. Accordingly, the axial load in the yield point for a certain type of fastener varies a lot since it is highly dependent on the actual friction conditions in the fastener.

OBJECT OF THE INVENTION

The invention intends to provide a method for accurately determining the axial load in a threaded fastener as the latter is tightened above its yield point by using the change in travel time of ultrasonic waves induced in the fastener for determining the axial load in the yield point as well as in the final pretension level of the fastener.

Further characteristics and advantages of the invention will appear from the following description and claims.

DETAILED DESCRIPTION

The new method according to the invention comprises a pre-tightening investigation process in which the actual type of fastener is subjected to tightening operations including pre-tensioning into the plastic deformation range. This pre-tightening investigation process includes tightening of a number of fasteners to a level above the yield point while measuring by means of a suitable equipment the applied torque, the rotation angle, the axial load, and the travel time for ultrasonic waves induced into the fastener.

Thereby, it is possible to determine the relationship between the axial load, the rotation angle and the ultrasonic wave travel time. It is also possible to investigate the magnitude and the scattering of the torque level at which the fastener starts deforming plastically.

It is important to determine the relationship between the axial load and the travel time for the ultrasonic waves in the plastic deformation range of the fastener, because in that range this relationship is no longer linear. It is of particular importance to investigate how the axial load above the yield point varies with the axial load level in the yield point. The higher the frictional resistance the lower axial load in the yield point. As mentioned above, the explanation to this is that both the axial load and the torsional load contribute to the strain in the fastener and cause together the fastener material to yield at a certain level. This means that a high frictional resistance causes the fastener material to yield at a lower axial load, and, accordingly, it is important to include in the investigation process fasteners having the lowest and highest frictional resistance that can be expected in a normal fastener production, because that would give an indication not only on the scattering range of the frictional resistance but also of the lowest axial load to be expected at the yield point of the fastener. This information is of decisive importance when determining the proper size of fastener to be used.

Since the ultrasonic wave travel time reflects the axial load in the elastic deformation range only, it is not possible to use this travel time to indicate the yield point. Instead, the yield point is suitably detected as a significant change in the torque/angle relationship. It may, however, be detected in any other suitable way. In the yield point, the travel time for the ultrasonic waves is determined, though, so as to make it possible to relate the axial load in the following plastic deformation range to a corresponding axial load/travel time relationship determined during the pre-tightening investigating process.

In practice, a fastener of the actual type is intended to be tightened to a predetermined axial load chosen within the range available for this type of fastener as determined during the previous test runs of the fastener. A torque is applied on the fastener and the instantaneous values of the torque, angle of rotation and the ultrasonic wave travel time are indicated. The ultrasonic wave travel time is indicated from the very start of the process to obtain a value for the travel time through the fastener in unloaded condition.

As the yield point is detected by the change in, for instance, the torque/angle relationship, the tightening is continued to a wave travel time value which according to the pre-tightening investigation corresponds to the desired axial load.

By indicating the travel time value for the ultrasonic waves through the fastener in the yield point and relating the following travel time values indicated above the yield point, it is possible to compensate for variations in the frictional resistance from one fastener to another and to obtain a substantially improved result as to the axial load obtained in the fastener.

The above discussed fastener characteristics as well as the new method according to the invention are illustrated in the diagrams shown in the accompanying drawings, whereof FIG. 1 shows a diagram illustrating the axial load N and the travel time $\Delta t$ for ultrasonic waves induced in the fasteners as a function of angular displacement $\Phi$ of two fasteners of the same type tightened into the plastic deformation range.

FIG. 4 shows a diagram illustrating the tightening method according to the invention, wherein the target axial load $N_F$ is achieved at an ultrasonic wave travel time $\Delta t$ related to the actual frictional conditions and, hence, the yield point Y of the fastener.

The diagrams on the accompanying drawings show curves illustrating the relationship between the axial load N and the angle of rotation $\Phi$ of two fasteners I and II when tightened into the plastic deformation range. Depending on the difference in frictional resistance $\mu$ between the two fasteners, the yield points $Y_I$ and $Y_{II}$, respectively, are reached at two different levels of axial load, namely at the lower level $N_{FI}$ of the one having the higher frictional resistance $\mu_I$ and at the higher load level $N_{FII}$ for the one having the lower frictional resistance $\mu_{II}$.

Figure 1:
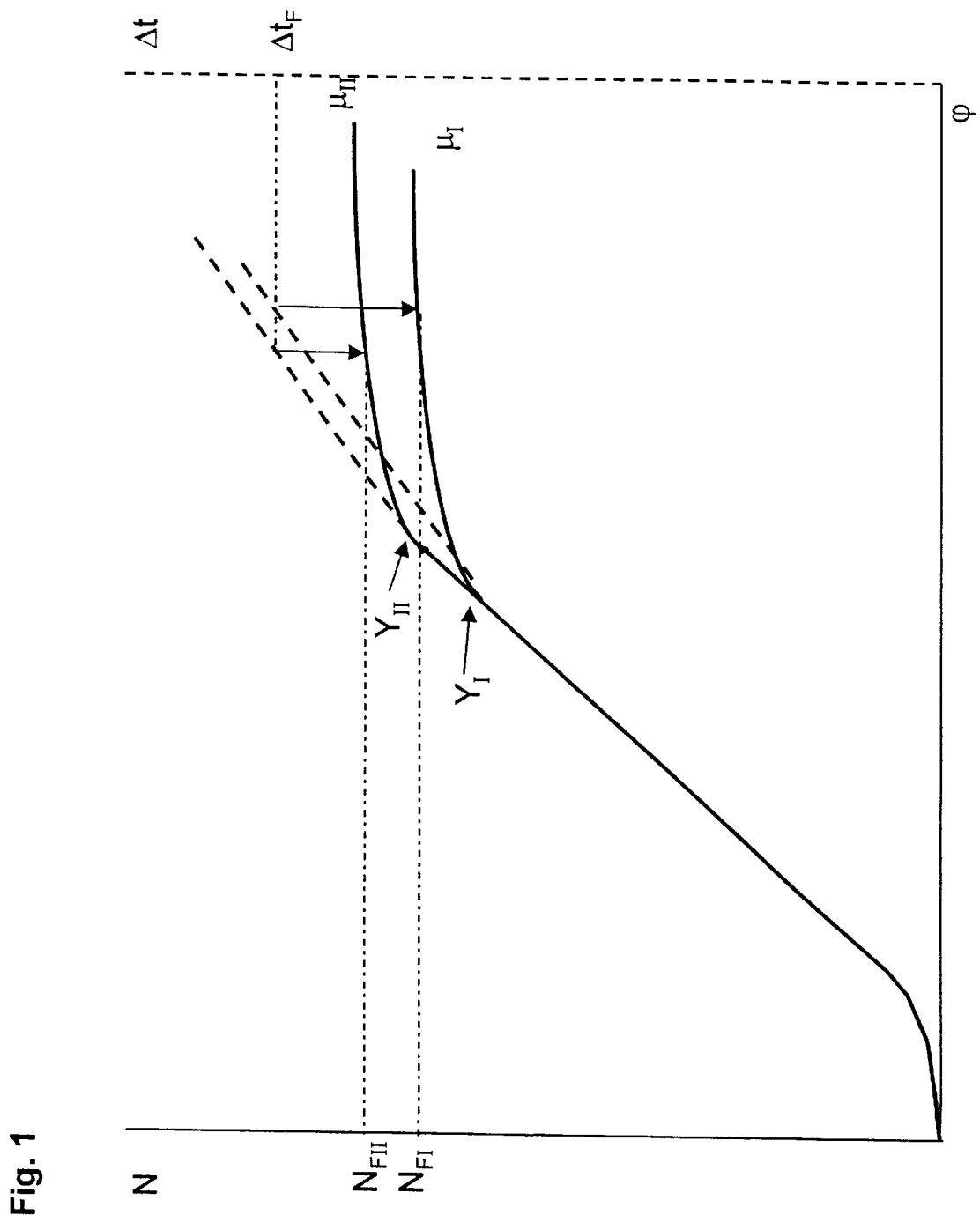

In the diagram in FIG. 1, there is illustrated in dash lines how the ultrasonic wave travel time $\Delta t$ changes in the plastic deformation range in relation to the rotation angle $\Phi$. During the elastic deformation of the fastener, the travel time $\Delta t$ changes linearly together with the axial load N, but due to the plastic deformation of the fastener above the yield point the travel time $\Delta t$ changes at a somewhat slower rate in relation to the elongation of the fastener.

Accordingly, the travel time $\Delta t$ for the induced ultrasonic waves continues to increase mainly as a linear function also above the yield point, whereas the axial load N gets a much lower non-linear increase rate. The vertical arrows in the diagram illustrate the projections of a certain final ultrasonic travel time $\Delta t_F$ on the two different axial load/angle curves. Apparently, there is obtained a significant difference in the final axial load $N_F$ in the two fasteners for this chosen magnitude of $\Delta t$. This is due to the significant difference in the axial load $N_{FI}$ and $N_{FII}$, respectively, actually obtained in the respective yield points $Y_I$ and $Y_{II}$, as well as the individual growth of the axial load N as a function of the angular displacement $\Phi$ in the plastic deformation range.

If it is decided to interrupt the tightening process at the travel time level $\Delta t_F$, the high friction fastener I would generate a final axial load $N_{FI}$ which is much lower than the final axial load $N_{FII}$ generated by the low friction fastener II. This is related to the fact that the high friction fastener I generates a relatively low axial load N in its yield point $Y_I$. The low friction fastener II, on the other hand, generates a relatively high axial load N in its yield point $Y_{II}$. See the diagram in FIG. 1.

By relating a certain ultrasonic wave travel time $\Delta t$ to the travel time detected in the yield point Y, and comparing it with stored pre-tightening investigation results, it is possible to determine N as a function of the ultrasonic travel time $\Delta t$ and, hence, the finally obtained axial load $N_F$.

Figure 3:
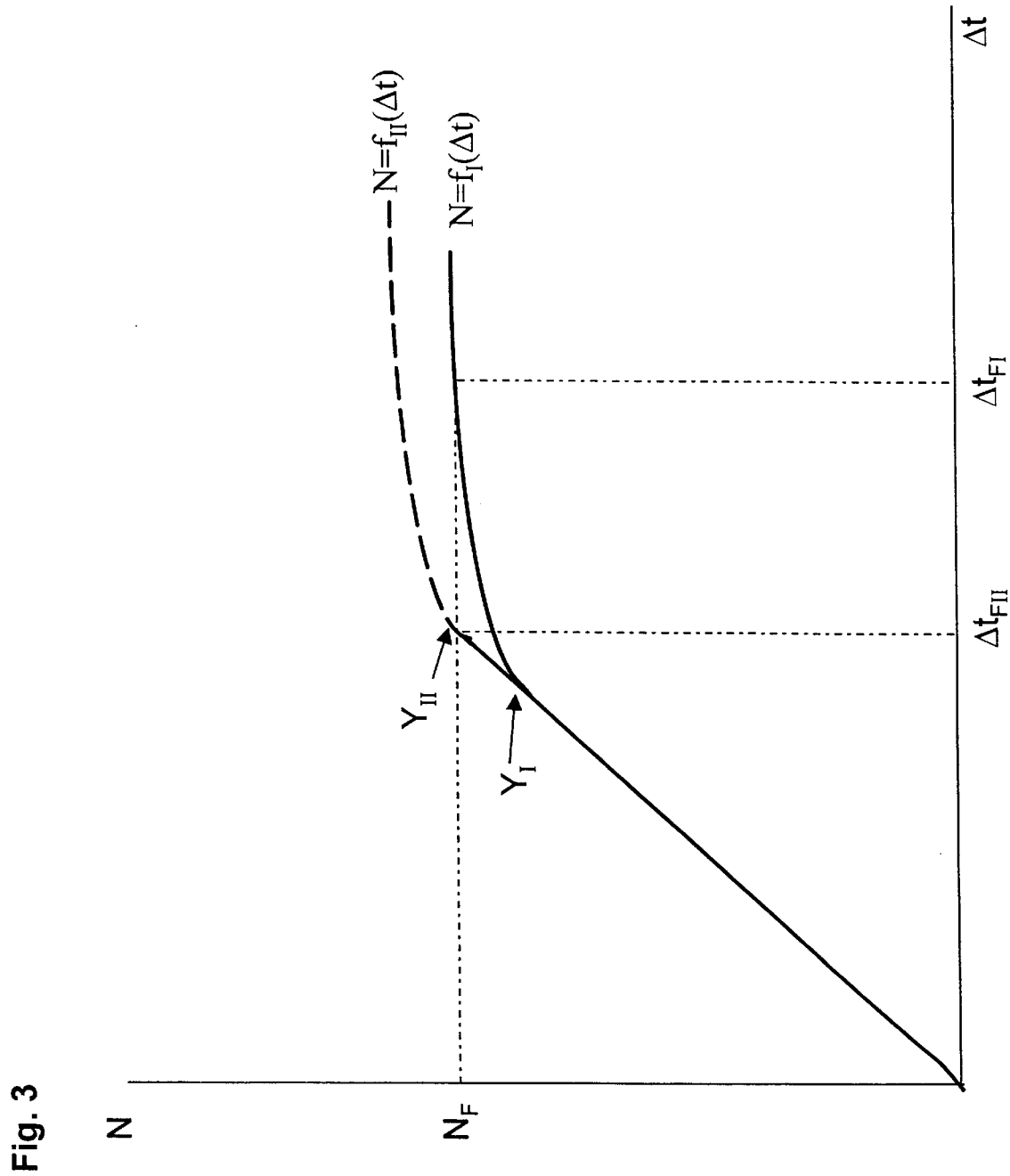
FIG. 3 shows a diagram illustrating the axial load N as a function of the ultrasonic travel time $\Delta t$ for two fasteners of the same type subjected to different frictional resistance.

Accordingly, the method according to the invention is based on a couple of pre-tightening fastener investigating steps, namely:

I) Determining the scattering range of the frictional resistance, including the axial load N obtained in the yield point Y for each one of a number of fasteners of the actual type, as well as the development of the axial load N as a function of the ultrasonic travel time $\Delta t$ in the plastic deformation range. By this knowledge it is possible to determine the correct final travel time $\Delta t_{FI}$ and $\Delta t_{FII}$, respectively, for the individual fastener such that the same desired final target load level $N_F$ is achieved. See FIG. 3.

Figure 2:
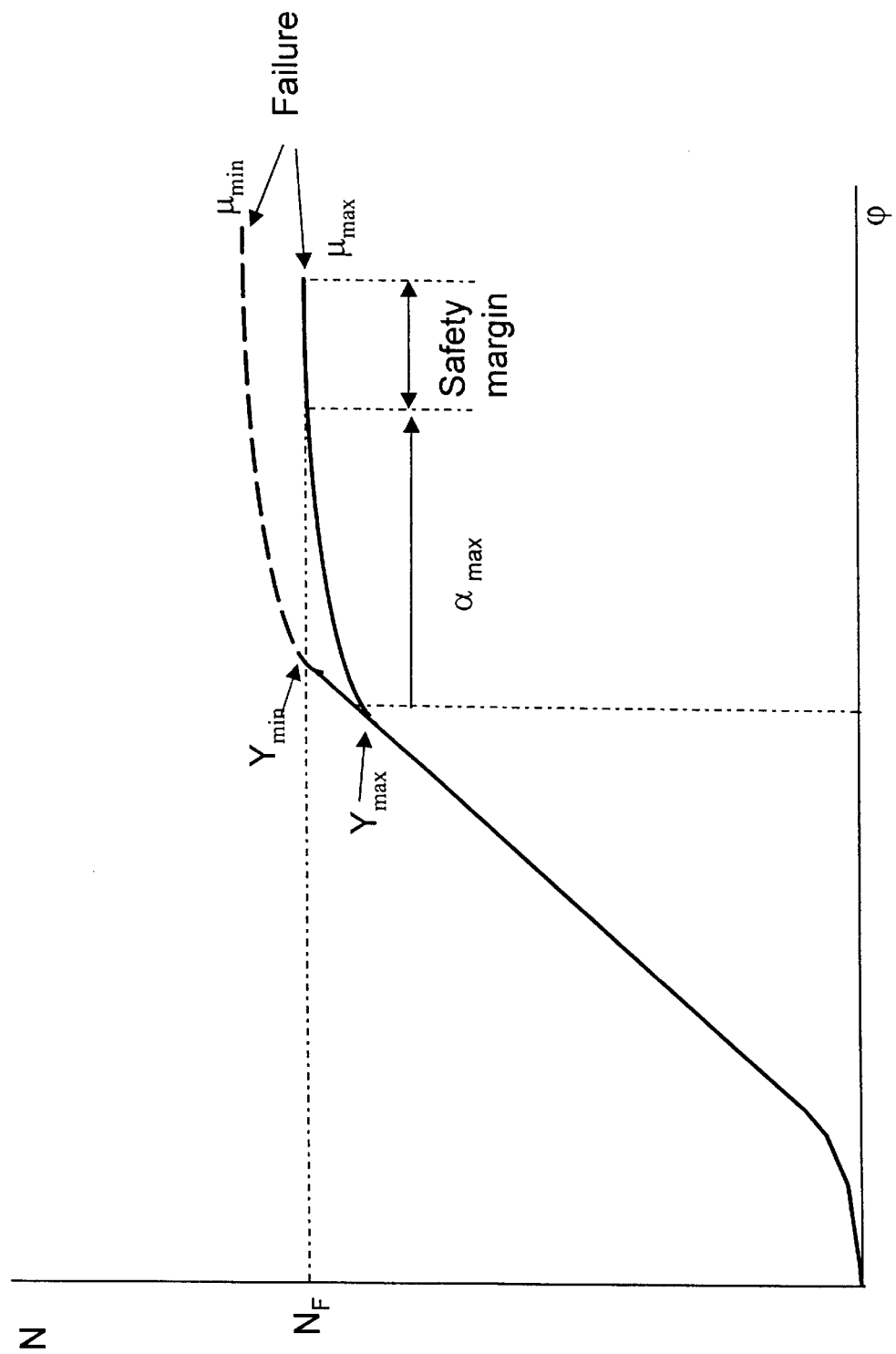
FIG. 2 shows the same processes and illustrates the maximum expected target load $N_F$ for two or more fasteners of the same type in relation to the maximum permissible safety angle $\alpha_{max}$ of fastener rotation.

II) Determining the target axial load $N_F$ for the actual type of fastener by adding to the angular position in the yield point $Y_{MAX}$ of that fastener having the highest frictional resistance $\mu_{MAX}$ in the scattering range a maximum rotation angle $\alpha_{MAX}$, leaving a safety margin to the fastener failure point. See FIG. 2.

A result may be that the fastener having the lowest frictional resistance $\mu_{MIN}$ in the determined scattering range may have its yield point $Y_{MIN}$ above the target torque level $N_F$.

These pre-tightening studies of a preliminary chosen type of fastener confirm whether the lowest safely guaranteed axial clamp load N obtained by these fasteners, i.e. the clamping force obtained by that very fastener exposed to the worst friction conditions and having the lowest yield point $Y_P$, is high enough to satisfy the actual requirements on the axial clamping force. If not, a stronger type of fastener has to be chosen.

Having determined and stored the ultrasonic travel time values $\Delta t$ in the yield point Y as well as the relationship between the axial load N and the ultrasonic travel time $\Delta t$ in the plastic deformation range for a great number of fasteners of the chosen type, production tightening processes can be performed to ultrasonic travel time values $\Delta t_F$ determined for each fastener by the previously determined relationship: $N=f(\Delta t)$ as well as the actual travel time value in the yield point Y. See FIG. 4. Accordingly, each fastener is tightened to an ultrasonic travel time value $\Delta t_F$ which according to the actually determined yield point value and the corresponding $N=f(\Delta t)$ for that particular fastener results in the desired axial load level $N_F$. See FIG. 4.

The advantage of this method is that the friction related scattering of the obtained axial clamping load is kept to a minimum, while at the same time utilising the full strength of the fastener in the worst case, i.e. the case with the highest frictional resistance and the lowest load N reached in the yield point Y. In other words, the maximum axial load obtainable at the safety margin angle $\alpha_{MAX}$ of the fastener having the lowest yield point load level is appointed the target axial load $N_F$ for all fasteners of the particular type. This means that there is no risk for exceeding the safety margin for any one of the fasteners.

What is claimed is:

1. A method for tightening a threaded fastener to a desired final axial load ($N_F$) above a yield point (Y) of the fastener, said method comprising:

detecting instantaneous values of applied torque, angular displacement ($\Phi$) of the fastener, and travel time ($\Delta t$) of ultra-sonic waves induced in the fastener;

detecting the yield point (Y) of the fastener as a significant change in a relationship between two tightening parameters, and detecting an ultra-sonic wave travel time ($\Delta t_Y$) at the yield point (Y) of the fastener;

determining the axial load ($N_Y$) at the yield point (Y) of the fastener by comparing the ultra-sonic wave travel time ($\Delta t_Y$) at the yield point (Y) of the fastener with a pre-established ultra-sonic travel time ($\Delta t$) in an unloaded fastener; and continuing tightening of the fastener into a plastic deformation region beyond the yield point (Y) of the fastener until the detected instantaneous value of the ultra-sonic wave travel time ($\Delta t$) reaches a level ($\Delta t_F$) which according to a pre-tightening determined relationship between the ultra-sonic travel time ($\Delta t$) and an axial load (N) above the yield point corresponds to the desired final axial load ($N_F$).

2. The method according to claim 1, comprising a pre-study step of determining a maximum ultra-sonic wave travel time ($\Delta t_{max}$) corresponding to a maximum safety angle of rotation ($\alpha_{max}$) beyond the yield point (Y) of each one of a plurality of the fasteners, wherein the maximum ultra-sonic wave travel time ($\Delta t_{max}$) of that fastener having a lowest yield point level corresponds to a highest final axial load ($N_F$) to be safely expected.

* * * * *